Jan. 26, 1965   L. E. ELLISON   3,166,932
CORROSION-TEST PROBE WITH REPLACEABLE TEST SPECIMENS
Filed Dec. 22, 1961
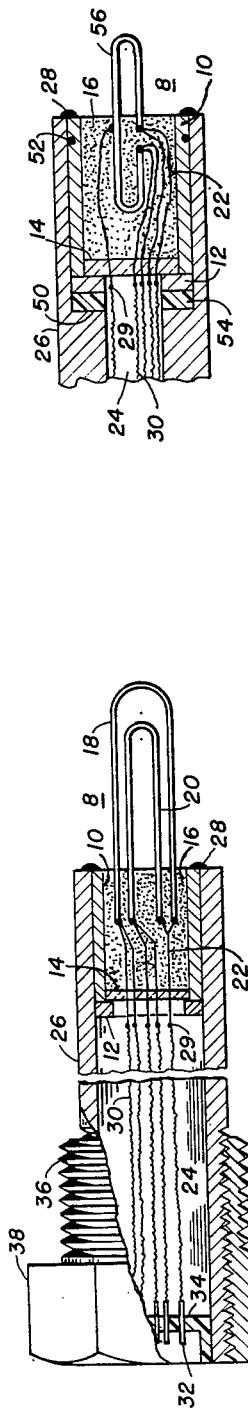
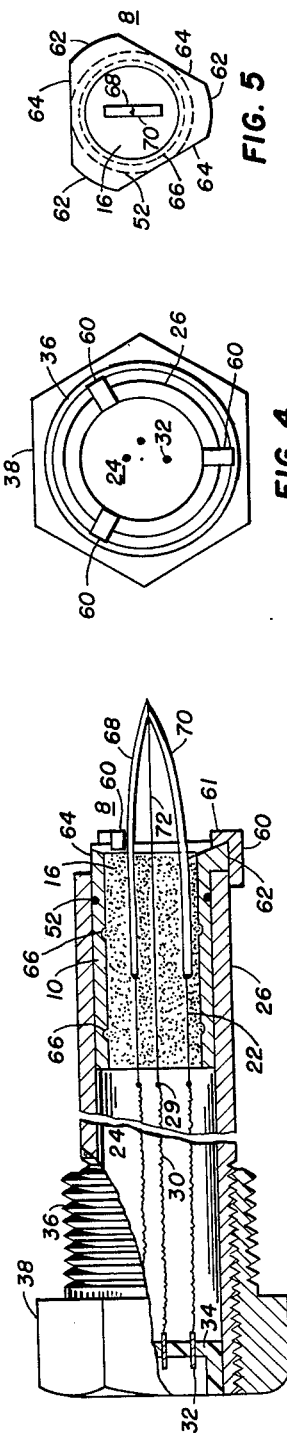
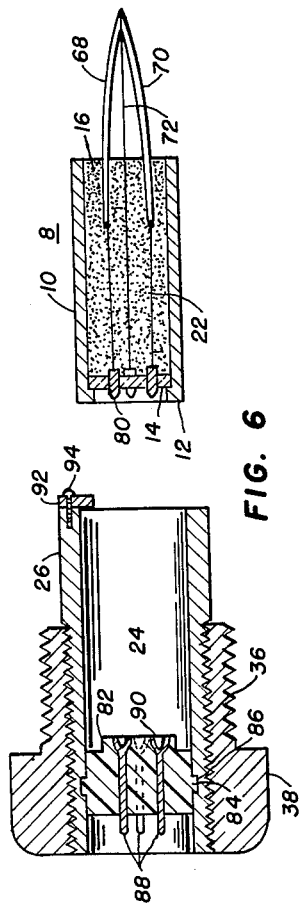
INVENTOR.
LYNN E. ELLISON
BY Edward H Lang
ATTORNEY

United States Patent Office 3,166,932
Patented Jan. 26, 1965

3,166,932
CORROSION-TEST PROBE WITH REPLACEABLE TEST SPECIMENS
Lynn E. Ellison, Crystal Lake, Ill., assignor to The Pure Oil Company, Chicago, Ill., a corporation of Ohio
Filed Dec. 22, 1961, Ser. No. 161,720
6 Claims. (Cl. 73—86)

This invention relates to apparatus for the measurement of corrosion by resistant-change techniques and, more particularly, to corrosion-test probe assemblies designed so that the test specimens can be easily replaced.

Various corrosion-test probes have been proposed and used for determining surface corrosion rates. Corrosion-test probes and measurement devices of the resistance-change type, as described in U.S. Patents Nos. 2,824,283 and 2,830,265 granted to Lynn E. Ellison, and U.S. Patents Nos. 2,851,570, 2,864,252, 2,987685 and 2,994,219 granted to Edward Schaschl have been found to be especially useful in measuring surface corrosion rates. Such probes utilize one exposed test specimen and a reference specimen protected by a corrosion-impervious material to provide automatic temperature-resistance compensation. The resistance ratio of the two specimens changes as the exposed test specimen corrodes and its cross-sectional area is decreased. The extent of corrosion is measured by means of a resistance ratio-change-measuring circuit such as a Wheatstone bridge circuit.

Other corrosion probes, such as disclosed by Dravnieks, U.S. Patent No. 2,735,754, employ two bare specimens which are exposed to the corrosive environment. One of the specimens, instead of being coated with a corrosion-impervious material, is made much thicker than the test specimen, so that the corrosion rate of the thicker specimen, expressed as percent of thickness, differs substantially from that of the test specimen, and the rate of percentage resistance change of the specimens differs even though they corrode at the same absolute rate.

In many of the previous designs of such corrosion-test probes, the test specimens are usually rigidly supported in the probe body by a potting cement or equivalent means in order that the probe assembly can withstand the mechanical stress and elevated temperatures and pressures to which it might be subjected while exposed to the corrosive environment. Corrosion-test probes of such a design suffer from the disadvantage that it is difficult, if not impractical, to replace the expendable specimens after the probe has been used for corrosion measurement in order that the relatively costly probe body can be used again. It has been proposed to solve this problem by supporting the specimens, as by a potting cement, within a disposable body which is threadably received in a support member. However, a disadvantage of such a corrosion-test-probe assembly is that during the assembly, lead wires extending from the disposable body are twisted while the disposable body is rotated several times to thread it to the support member, resulting in the weakening and a possible break of the lead wires. This disadvantage has been recognized by the prior art, which has proposed to avoid it by encasing the lead wires, which extend from the disposable member, in cement. Another solution which has been proposed is to run the lead wires through apertures of insulators disposed in spaced end-to-end relationship within the bore of the support body, the insulators being free to rotate as the disposable member is threaded. It can be seen that the former solution complicates the fabrication of the disposable element while the latter solution complicates the assembly of the test probe. The need for a corrosion-test-probe assembly which utilizes the corrosion-measurement methods described in the foregoing patents and permits easy replacement of the specimens has not been met.

The corrosion-test-probe assembly of this inveniton is an improvement over the test probes previously proposed in that it is adapted to permit rapid and convenient replacement of the expendable specimens, and it is adapted to be used both under conditions of elevated pressure and temperature. The probe assemblies of the present invention can be used in conjunction with the electronic circuity described in the foregoing patents.

It is a primary object of this invention to provide a corrosion-test-probe assembly to be used with an electrical resistance-measuring apparatus to determine the corrosivity of an environment. Another object of this invention is to provide a corrosion-test probe which can be used under conditions of elevated temperature and pressure. Still another object of this invention is to provide a corrosion-test-probe assembly having novel means for holding the expendable specimens. Yet another object of this invention is to provide a corrosion-test-probe assembly having a body member which can be re-used numerous times. A further object of this invention is to provide a corrosion-test-probe assembly which features easy replacement of an expendable member thereof. These and further objects of the invention will become apparent as the description herein proceeds and reference is made to the accompanying drawings in which:

FIGURE 1 is a partial cross-sectional view of one form of the novel test probe assembly;

FIGURE 2 is a fragmentary cross-sectional view of another form of the novel probe assembly;

FIGURE 3 is a partial cross-sectional view of still another embodiment of the novel test probe assembly;

FIGURE 4 is an end view of the probe body member shown in FIGURE 3;

FIGURE 5 is an end view of the disposable member of the embodiment shown in FIGURE 3; and FIGURE 6 is a disassembled cross-sectional view of a fourth embodiment of this invention.

Briefly, the probe assembly of this invention consists of two major portions, a body, or support, portion and a replaceable portion. The body portion is an elongated member having a bore extending therethrough. Slidably received in one end of the bore is the replaceable member, which carries the test and reference specimens with at least the test specimen being supported for exposure by a corrosive environment. The replaceable member is held within the bore without being threaded to the body member. The terminal ends of the two specimens are electrically connected to a suitable resistance-ratio-change-measuring circuit. Thus, the deficiencies of the prior art corrosion probes which have been hereinbefore enumerated are solved by the corrosion probe assembly of my invention.

For a more complete understanding, of my invention, reference is made to the accompanying drawings wherein like parts bear the same reference numeral in each of the several drawings.

Referring to FIGURE 1, numeral 8 indicates the replaceable member which is a tube-like member having side walls 10 and washer-shaped end 12. The aperture through end 12 is covered with glass disc 14 in replaceable member 8 and fused to end 12. Held for exposure to a corrosive environment within replaceable member 8 by a castable cement 16 are U-shaped elements 18 and 20. Castable cement 16 is a chemically inert, electrically non-conductive material capable of withstanding the elevated temperatures and pressures to which the probe assembly is exposed. Suitable materials include epoxy resins, the sodium silicate Sauereisen cements, and the like. Specimens 18 and 20 are of a corrodible, electrically conductive material and preferably have substantially identical temperature coefficients of resistance.

Specimen 18, which serves as the test specimen is unprotected, while reference specimen 20 may either be protected by a non-conducting material which prevents the corrosive environment from attacking it or is thicker than test specimen 18. Suitable materials for protecting reference specimen 20 and the thickness of specimens 18 and 20 are described in the aforementioned patents. Connected to the terminal ends of specimens 18 and 20 and sealed in cement 16 are lead wires 22, which pass through glass disc 14 in sealed relationship therewith, and are spaced from each other. Replaceable member 8 is received in bore 24 of body 26 and is held in place by being welded or soldered thereto, as indicated by numeral 28. The shapes of the outer surface of replaceable member 8 and bore 24 adjacent thereto, conform to each other and are substantially smooth surfaces of such dimensions that replaceable member 8 is freely slidable in bore 24. For example, if replaceable member 8 and bore 24 are of circular cross-section, the diameter of the outer surface of replaceable member 8 is slightly less than the diameter of bore 24. Electrically connected to lead wires 22, as by solder connections 29, are lead wires 30 which extend through bore 24 in electrically insulated relationship and are electrically connected to elongated electrically conductive elements 32. Lead wires 30 are of sufficient length so that they can be soldered to leads 22 while replaceable member 8 is withdrawn from bore 24. Elongated elements 32 pass through insulator 34, secured within bore 24, in spaced relationship so that electrical connections to a suitable measuring circuit can be connected thereto. Body 26 is preferably provided with threads 36 for inserting the probe assembly into a threaded opening in a process vessel and hexagonal head 38 to accommodate a wrench which may be used to tighten the probe in place.

After the probe assembly is used for corrosion measurement in the manner described in the aforementioned patents, it is removed from the corrosive environment and weld 28 is carefully removed. Replaceable member 8 is then withdrawn from bore 24 and solder connections 29 are broken. Next, a new replaceable member 8 containing specimens 18 and 20 mounted in cement 16 is provided, lead wires 22 are soldered to lead wires 30, replaceable member 8 is inserted in bore 24, and a new weld 28 is made. If desired, bore 24 behind replaceable member 8 can be filled with some inert non-caking solid such as flowers of silica. Weld 28 is preferably made around the entire periphery of replaceable member 8 to seal bore 24 as well as to hold replaceable member 8 in place. Thus, with a new replaceable member 8 installed, the probe assembly can be used for another corrosion measurement.

Referring to FIGURE 2, body 26 is the same as that described in relation to FIGURE 1 except that the interior wall is formed with shoulder 50. Shoulder 50 serves to prevent the entry of replaceable member 8 into bore 24 beyond shoulder 50. O-ring 52 of a resilient material inert to the corrosive environment is provided in a groove around the peripheral surface of replaceable member 8 to prevent the corrosive environment from entering bore 24. If desired, gasket 54 of a resilient material may be provided between shoulder 50 and end 12. In this embodiment, specimen 56 is a single-strip element of a corrodible, electrically conductive material providing a test specimen exposed to the environment under study and a temperature-compensating reference specimen protected from the environment. It will be evident that the same result can be obtained, that is, prevent the entry of replaceable member 8 into bore 24 beyond a certain point, by tapering the outer surface of replaceable member 8 and the portion of bore 24 in which it is inserted. It will also be apparent that the test and reference specimens shown in FIGURE 2 can be used in place of those shown in FIGURE 1 and vice versa.

In the embodiment illustrated in FIGURES 3 to 5, body 26 is the same as described in relation to FIGURE 1 except a plurality of spaced L-shaped members 60 are secured to the outer surface of body 26 at the end thereof with one leg spaced from the end of body 26. The face 61 of each leg spaced from the end of body 26 is sloped in the same direction around the end of the body. Replaceable member 8 is provided with lip 62, which has flats 64 cut into the edges thereof so that it can pass L-shaped members 60 and be rotated into secure position between the end of body 26 and L-shaped members 60. The thickness of lip 62 is less than the greatest distance between the end of body 26 and the sloping faces of L-shaped members 60 spaced therefrom, but is greater than the smallest distance between the two. It is evident that as replaceable member 8 is turned, the sloped faces of L-shaped members 60 will press against lip 62 to seal it against body 26. The bore of replaceable member 88 is provided with recesses 66 to afford mechanical strength for the installation of cement 16. In order to assure a fluid-tight seal of bore 24, O-ring 52 of a resilient material inert to the corrosive environment may be provided in a groove around the peripheral surface of replaceable member 8. O-ring 52 engages the walls of bore 24 in fluid-tight relationship therewith in the assembly of the probe, thereby affecting the fluid-tight seal of bore 24. In this embodiment, test specimen 68 and reference specimen 70 are shown as unprotected, elongated elements with reference specimen 70 being thicker than test specimen 68. Lead wire 72 is protected from the corrosive environment by coating with a suitable material such as epoxy resin. Although the assembly of this probe requires that replaceable member 8 be turned, it need be turned only about 20° as compared with several complete revolutions required to thread prior art replaceable members to the supports.

In the embodiment illustrated in FIGURE 6, lead wires 22 and 72 connected to the terminal ends of specimens 68 and 70, are connected to elongated electrically conductive elements 80. Elements 80 are sealed through glass disc 14 in spaced relationship to each other. Body 26 is provided with plug 82 of an electrically non-conductive material having external collar 84 projecting into internal recess 86 within body 26 to prevent withdrawal of plug 82. Sealed through plug 82 are elongated electrically conductive elements 88 having sockets 90 to receive elements 80 in electrical conductive relationship therewith. The shape of plug 82 and the length of body 26 are such that when the probe is assembled, end 12 of member 8 will rest on plug 82. If desired, body 26 may be provided with stop 92, which is held in place by screw 94, to securely hold replaceable member 8 within bore 24.

Body 26 is preferably of stainless steel while wall 10 can be fabricated from an alloy steel. Sidewall 10 and bore 24 can be of any cross-section, such as circular, square, hexagonal, and the like, except in the embodiment depicted in FIGURES 3 to 5, it is essential that they be of circular cross-section. Plugs 34 and 82 may be of materials such as polytrifluoroethylene, polytetrafluoroethylene, urea-formaldehyde resins, and the like. These and other plastic materials which can be used are described in detail in "Modern Plastics Encyclopedia," volume 38, No. 1A, published in 1960 by Plastics Catalogue Corporation of Bristol, Connecticut. The Plastics Property Chart accompanying this publication gives the physical, chemical, electrical, molding and other properties of numerous plastics, and their trade names.

Materials from which the test and reference specimens can be fabricated, the dimensions of the specimens, and suitable coatings for the reference specimen, if so desired, are described in detail in the foregoing patents. The test elements of any modification can be interchanged with those of any other modification.

While this invention has been described in relation to specific embodiments, it will be evident that various modifications can be made by one skilled in the art without departing from the intended scope of this invention. For example, wall 10 may be provided with a protrusion extending therefrom in the direction of the exposed specimen to facilitate its removal from bore 24.

The embodiments of this invention in which an exclusive property or privilege is claimed are defined as follows:

1. A corrosion-test probe comprising an elongated, hollow, metallic supporting member, an insulating plug, containing electric connector elements, mounted at one end of said supporting member for connecting the probe to an electric measuring circuit, a detachable assembly slidably mounted in and soldered to the tip of the opposite end of said supporting member, said detachable assembly comprising (1) a hollow metallic member, relatively short as compared with said supporting member and shaped to conform to the adjacent bore of said supporting member (2) a reference specimen tightly sealed to said short hollow member and (3) a test specimen tightly sealed to said short hollow member and carried in exposed relation beyond said supporting member, flexible electrical conductors, extending through said elongated hollow, metallic supporting member and connecting said test specimen and said reference specimen to said electric connector elements, said conductors being freely extendable and of sufficient length within said supporting member to permit detachment of said detachable assembly after removal of the soldered connection with the tip by slidably removing it from said opposite end of the supporting member, without disturbing the electrical connections at said electrical connector elements, and to permit replacement of another detachable assembly in the supporting member.

2. A corrosion-test probe in accordance with claim 1 in which said reference element is located within the confines of said supporting member.

3. A corrosion-test probe in accordance with claim 1 in which said detachable assembly has a glass disc mounted in one end thereof through which electrical conductors, connecting said flexible conductors to said specimens, pass in sealed relationship therewith.

4. A corrosion-test probe in accordance with claim 1 including means within said elongated, metallic, hollow, supporting member to prevent entry of said detachable assembly into said elongated member beyond said means.

5. A corrosion-test probe in accordance with claim 4 in which said means is a shoulder formed on the inner wall of said elongated member.

6. A corrosion-test probe in accordance with claim 1 in which said elongated, metallic, hollow, supporting member includes a plurality of lip-engaging members having sloped faces spaced from said opposite end of said elongated member and said detachable assembly includes a lip having flats cut out of the peripheral edge thereof, said lips being adapted to be secured under said lip-engaging members upon rotation of said detachable assembly through an arc of about 20 degrees.

References Cited by the Examiner

UNITED STATES PATENTS

| | | | |
|---|---|---|---|
| 2,088,218 | 7/37 | Schilling | 339—90 X |
| 2,878,354 | 3/59 | Ellison | 73—86 X |
| 2,946,952 | 7/60 | Marsh et al. | 73—86 X |
| 2,993,366 | 7/61 | Birkness | 73—86 |

FOREIGN PATENTS 310,335    8/14    Germany.

RICHARD C. QUEISSER, *Primary Examiner.*

JOSEPH P. STRIZAK, *Examiner.*